May 30, 1933.   C. N. MITCHELL   1,912,088
METHOD OF MAKING STEERING WHEELS
Filed Sept. 25, 1930
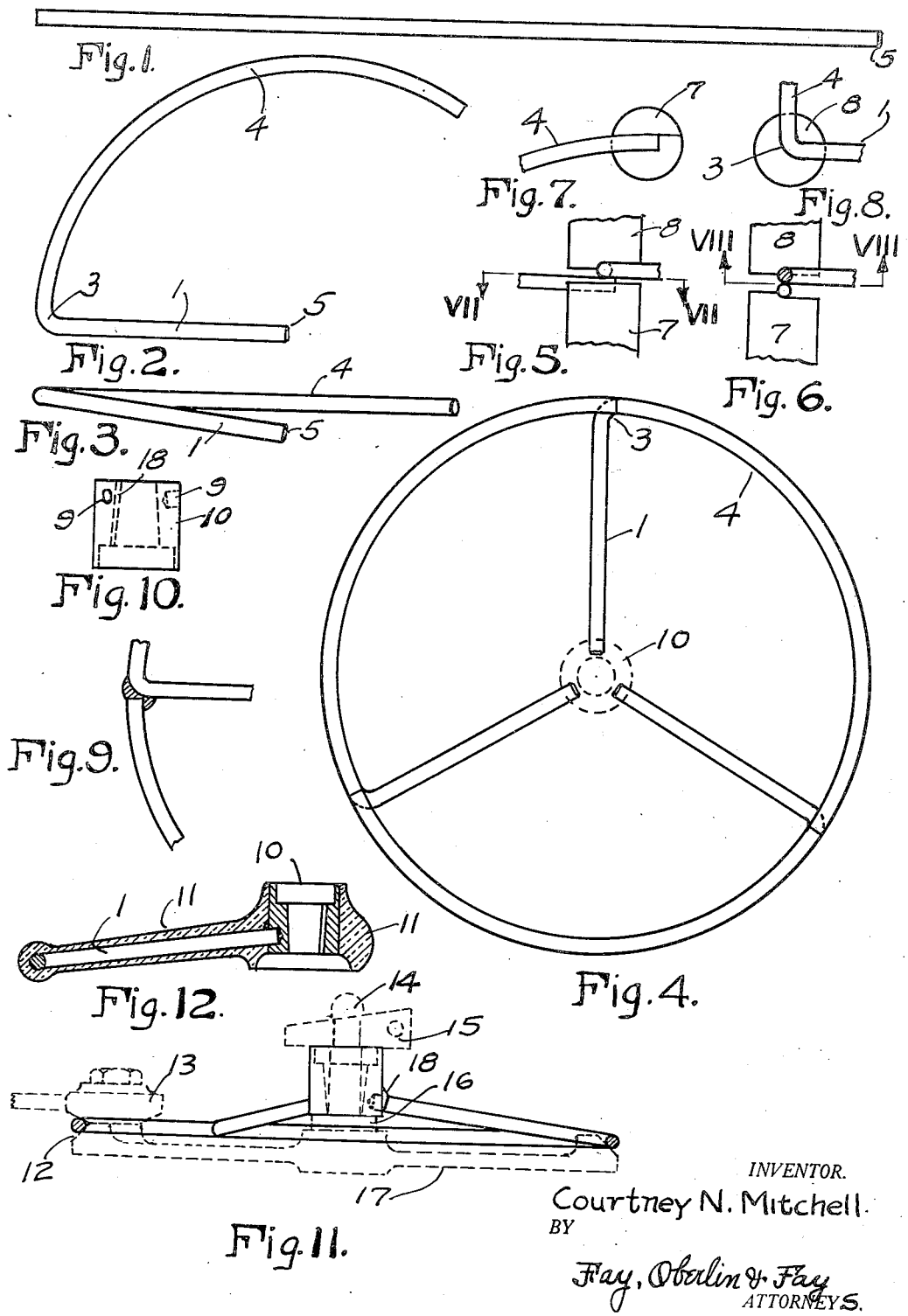
INVENTOR.
Courtney N. Mitchell.
BY
Fay, Oberlin & Fay
ATTORNEYS.

Patented May 30, 1933

1,912,088

UNITED STATES PATENT OFFICE

COURTNEY N. MITCHELL, OF CLEVELAND HEIGHTS, OHIO, ASSIGNOR TO THE J. & M. MACHINE COMPANY, OF CLEVELAND, OHIO, A CORPORATION OF OHIO

METHOD OF MAKING STEERING WHEELS

Application filed September 25, 1930. Serial No. 484,381.

The present invention relates to the manufacture of steering wheels using metallic inserts or reinforcement members which act as a framework for carrying the loads imposed upon the wheels. These inserts are encased in a vulcanized rubber exterior or a material of similar composition resulting in a product having a smooth, homogeneous surface. The tensile strength of vulcanized rubber or other composition material commonly used for such covering is not in and of itself sufficient to withstand the shocks and strains that are imposed on steering wheels in modern high speed automotive mechanisms. Therefore it is necessary to enhance the tensile and torsional strength of such parts by the insertion of metallic reinforcement.

The general object and nature of this invention is to provide a method whereby these reinforcing members can be manufactured more economically and expediently and to produce a finished article of maximum strength.

More particularly my invention consists of a process of welding together the insert elements, viz., the rim, spokes and hub, and molding a non-metallic covering thereon in such a manner as to result in substantially one integral piece. The methods of construction heretofore employed have consisted of affixing the elements to each other by means of rivets, threads, bolts, slots, crimps and other surface to surface means of jointure. By the use of weld joints, however, there is produced the maximum resistance to torsional and transverse stress. Also there is not present in a welded joint the possibility of working loose due to repeated and alternate strains that is found in an ordinary surface to surface attachment. Another advantage of my process lies in the extreme simplicity of fabrication due to the absence of various collateral steps, such as threading, machining shoulders, cutting slots, and trimming the excess material. The molding of non-metallic covering over an insert is much facilitated by maintaining smooth round sections which is possible with this construction. Obviously the result is a materially decreased cost and minimum time of production. The particular process of spot-welding the joints at the rim possesses an advantage over a mere arc welding of the abutting parts in that the members are integrated throughout the entire cross-section, whereas a joint of the latter type only partially unites the sections. A further advantage lies in the fact that due to the circular cross-section of the insert elements there is a maximum surface upon which to attach the non-metallic covering and the smooth round sections facilitate the molding operation of said covering.

To the accomplishment of the foregoing and related ends, said invention, then, consists of the steps hereinafter fully described and particularly pointed out in the claims, the annexed drawing and the following description setting forth in detail one approved method of carrying out the invention, such disclosed mode constituting, however, but one of various ways in which the principle of the invention may be used.

In said annexed drawing:—

Fig. 1 represents a spoke stock before any distorting operations have been performed; Figs. 2 and 3 show subsequent forms of the spoke and rim elements; Fig. 4 is a plan view of the assembled wheel element; Figs. 5 and 6 are elevations of the spot welding process; Fig. 7 is a cross-section taken substantially on the line VII—VII; Fig. 8 is a cross-section taken substantially on the line VIII—VIII; Fig. 9 represents a form of an arc butt weld on the rim section; Fig. 10 is an elevation of the hub member; Fig. 11 represents the device for adjustably setting the dish angle of the spokes; and Fig. 12 is a cross-section of a completed steering wheel with the composition material molded on.

The specific steps in my method are as follows: A piece of steel wire stock is straightened, chamfered at the end and cut off to the desired length, represented by Fig. 1. Next, the curved rim section 4 is bent in integral at point 3 with the spoke section 1, Fig. 2, the forming being done in a fixture of such construction as to leave the spoke 1 at approximately the correct angle with the plane of the arcuate section 4, as shown by Fig. 3. A hub member 10 is then prepared by boring out a central hole, broaching a keyway 18 therein and drilling radial recesses 9. In practice it is found more expedient to drill these latter radial recesses 9 simultaneously. The spoke elements are then assembled in the hub in a position, as shown in Fig. 4, with the ends of the rim sections 4 substantially overlapping the adjacent rim section at point 3. Electric spot-welding dies 7 and 8 are then imposed on the rim section at points 3 and forced together whereby the abutting sections are integrally welded to each other. Any desired number of these rim sections may be assembled, but it is found that due to the rigidity of construction, three of them are sufficient. The next operation is to place the circumferentially welded members in a retaining device 17 shown by the dotted lines in Fig. 11 in which the final operation in the forming of the spokes is completed and the angle between the spokes and plane of the rim is adjustably regulated. The rim sections are clamped securely to beveled edge 12 by means of clamps 13, bringing the rim sections into the form of a perfect circle. A hub member is rigidly retained in central relation to the rim member and against a collar 16 by means of a wedge key 15 and a central shaft 14. By varying the width of the collar 16, it is possible to regulate the angle of the spokes to any which might be desired. After clamping in said position, the ends of the spokes are welded to the hub member by means of arc welds 18. The last two steps may be substantially reversed, that is, welding the hub joints first and then the rim joints afterwards.

Fig. 9 shows an alternative form of rim weld joint by means of an arc butt weld.

The completed insert is then placed in a mold and the vulcanized rubber or similar composition material is molded on to produce a finished article of the desired contour. The complete offsetting of the spoke elements 1 may be performed in the device shown in Fig. 11 rather than in the preliminary formation of the rim and spoke elements. It is found in practice, however, more convenient to offset the spokes before assembly especially where a comparatively large angle of dish is required.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The method of making a metallic insert for steering wheels consisting in forming each of a plurality of lengths of suitable stock into an arcuate rim element and a single spoke, providing a suitable hub member having radial recesses therein, inserting the inner ends of said spokes in said recesses, aligning said rim elements to a true circle, securing each of said spokes to said hub member, and welding together said rim elements.

2. The method of making a metallic insert for steering wheels consisting in forming each of a plurality of lengths of suitable stock into an arcuate rim element and a single spoke element extending at an angle to the plane of said rim element, providing a suitable hub member having radial recesses therein, inserting the inner ends of said spokes in said recesses, aligning said rim elements to a true circle, securing each of said spokes to said hub member, and welding together said rim elements.

3. The method of making a metallic insert for steering wheels consisting in forming each of a plurality of suitable lengths of bar stock into an arcuate rim element and a single spoke, providing a suitable hub member having radial recesses therein, inserting the inner ends of said spokes in said recesses, aligning said rim elements to a true circle, securing each of said spokes to said hub member, and welding the free ends of said rim members to the next adjacent rim member at the juncture thereof with its associate spoke member.

Signed by me, this 23rd day of September, 1930.

COURTNEY N. MITCHELL.